3,032,598
CYCLIC OPERATION FOR THE CATALYTIC DEHYDROGENATION OF NORMALLY GASEOUS HYDROCARBONS
Donald H. Stevenson, Milmont Park, Pa., assignor to Air Products and Chemicals, Inc., a corporation of Delaware
No Drawing. Filed Dec. 8, 1959, Ser. No. 858,020
7 Claims. (Cl. 260—683.3)

This invention relates to improvements connected with the cyclic operation in the catalytic dehydrogenation of normally gaseous hydrocarbons. More particularly it concerns improvements in particular phases of the alternating on-stream and regeneration reaction cycles effected in the presence of certain catalysts. Even more particularly it relates to the dehydrogenation, in the presence of such catalysts, of more saturated hydrocarbons to less saturated hydrocarbons particularly useful in the preparation of polymeric substances and/or alkylation materials.

A wide variety of systems and processes have been shown in the art for the catalytic conversion of hydrocarbons, including those particularly directed to the conversion of more highly saturated normally gaseous hydrocarbons to less saturated normally gaseous hydrocarbons in one or more processing stages. Of particular interest for the present invention are those conversion systems and processes dealing with the dehydrogenation of $C_3$, $C_4$ and $C_5$ hydrocarbons. One such process or system successfully applied on a commercial scale over a number of years entails the passage of a charge stock of mixed $C_4$ hydrocarbons, rich in butane, over a dehydrogenation catalyst comprising chromium oxide supported on activated alumina. It has been established that such a system operates efficiently when utilizing a battery of converters operated in substantially adiabatic cycle designed to maintain a balance between the heat requirement for the endothermic dehydrogenation of the hydrocarbon charge during the on-stream period and the exothermic heat resulting during the regeneration portion of the cycle.

It has recently been described, in the copending application filed in the name of George Alexander Mills bearing Ser. No. 800,087, filed March 18, 1959, and entitled "Revitalizing Chromia Alumina Catalyst," that there are at least two types of deactivation to contend with in the normal cyclic operation in such process of dehydrogenation. One such type of deactivation is that long recognized in the art resulting from the deposition on the catalyst of hydrocarbonaceous material, i.e., coke, in small but effective amounts from the conversion of the hydrocarbons during the on-stream period. Another type of deactivation, for which the above identified application presents a novel and effective means of reactivation, is evidenced by an eventual loss in activity and/or selectivity which progressively occurs during the normal use of the catalyst and which is not due to the deposition of a hydrocarbonaceous deposit. Activity lost as a result of such latter type can not be restored by any of the normal activating treatments successful in connection with the removal of the coke deposit.

In the above identified application it was shown that chromia alumina catalysts show loss of activity of the second type when used under reducing conditions, for example, such as in butane dehydrogenation or after high temperature hydrogen treatment as may be employed after the periodic regenerations for coke removal. Such catalysts having lower activity resulting from reductive treatment and normal use in reducing atmospheres were found reactivatable by special treatment with gaseous oxygen. The particular conditions taught by said application include a preferred range of temperatures of about 1200–1350° F. for a time of about 5–12 hours, such treatment being separate and distinct from the normal regeneration and temperature adjustment treatments. In the usual battery of converters in which such special reactivation treatment is employed it is convenient to operate such batteries with one of the reactor cases used as a "swing case," such that the special reactivation treatment can be effected, when required or desired, independently of any operating pattern being followed by any other reactors in the battery. Furthermore since such special reactivation treatment is found necessary only after periods of operation appreciably in excess of those normally employed for coke removal in cyclic operations, it is apparent that while the average activity of all the catalyst in such a battery be effectively raised by such treatment there is a certain disparity between the freshly reactivated (by the special oxidative high temperature treatment) catalyst and the remainder of the catalyst in the battery which has lower general activity.

The difference between the activity level of the major portion of the catalyst—which is maintained at or near its maximum activity level through the regular cyclic regenerative coke removal—and the activity level of the minor portion of the catalyst—which has appreciably higher activity as a result of the special added reactivation treatment over the normal coke removal regeneration—creates a problem with respect to the above described desirable heat balanced operation as well as making available to the regular operation a portion of the catalyst capable of more effective quality than the operating conditions, adjusted to the lower activity level of the major portion of the catalyst, can properly exploit to the full. With respect to the effect of the more active portion of the catalyst upon introduction into the full cyclic operation, such catalyst, at the conditions appropriate to operation with the major portion of the catalyst, promotes a product distribution which differs, for example, in the formation of larger quantities of coke. The greater amount of coke in the regular regeneration portion of the cycle produces a greater amount of heat. Dissipation of the greater amount of heat must be effected, otherwise the catalyst so affected will thereafter make even more coke when contacted with the charge at a higher contact temperature. On the other hand when the temperature of the coke removal portion of the cycle is controlled to the usual degree, the more active nature of the catalyst promotes a higher order of reaction during the on-stream portion of the cycle; and such reaction being endothermic the catalyst temperature is reduced more than in other reaction zones in the battery.

It has now been found that more effective utilization of such reactivated catalyst can be obtained by particular operative techniques, which result further in a higher average level in operating results, obtaining to a fuller extent the benefits of the reactivation system described in the above identified application. By utilizing the method of the present invention, reasonably regular practice of the special oxidative high temperature reactivation treatment may be employed under circumstances maintaining heat balanced operation with the freshly activated catalyst and the rest of the operating system, with simultaneous utilization of its higher activity for desirable conversion.

In accordance with this invention sequential arrangement of the special high temperature ovidative reactivation of the catalyst is employed in such manner that the freshly activated catalyst is returned to participation in the regular cyclic operation under conditions of reduced severity during its particular on-stream portion of the cycle for at least 6 but no more than 36 normal on-stream cycles. By such arrangement previous difficulties of temperature control and failure to achieve full utilization of available activity in large measure are overcome.

While in the description which follows, and by way of illustration, the operation of the normally sequential cycle is directed particularly to production of butylene and/or butadiene, it will be understood that the invention is not limited thereto since the same principles are applicable in similar reactions with other charge stocks.

The typical catalyst used is one prepared by impregnation of a suitable heat treated activated alumina with a chromium compound to incorporate therein 5–45% and preferably about 20% $Cr_2O_3$ by weight of the catalyst. Such catalyst produces acceptable yields of desirable products over a reasonable life period for the catalyst when utilized in the normal type of operation. In such normal operations fresh charge, comprising substantially normal butane together with any hydrocarbon recycle material as may be desired or required, is preheated to approximately reaction temperature. Thereafter the heated charge is passed through the reactors containing the dehydrogenation catalyst and operating at dehydrogenation conditions in proper sequential operation in accordance with the cycle. Reaction product is withdrawn from the reaction zone and rapidly quenched to prevent substantial interaction or degradation of olefins or diolefins present in such effluent. For example, the charge may be passed at pressure of about 125 mm. mercury (absolute) through a bed of such chromia on alumina catalyst at an average temperature of about 1100° F. using a space rate of 1.5, measured as volumes of liquid per volume of catalyst per hour. At these conditions under normal operating circumstances, the effluent will probably contain a predominant amount of $C_4$ hydrocarbons comprising unreacted charge components as well as desired mono- and diolefin products, with minor amounts of $C_1$–$C_3$ hydrocarbons and $C_5$ hydrocarbons and about 1.3% by weight of hydrogen. The quenched product is thereafter separated by a combination of steps such as solvent distillation to provide a significant amount of the product stream containing the desired material, either butadiene or butylene; or separate streams of both.

Under normal operating circumstances, a typical cycle in a five-reactor battery is illustrated below:

TYPICAL CYCLE I

| Cycle Segment, min. | 0–4 | 4–8 | 8–12 | 12–16 | 16–20 (Repeat) |
|---|---|---|---|---|---|
| | Percent of Total HC[1] to Reactor | | | | |
| Reactor: | | | | | |
| 1 | 50 | 50 | | | |
| 2 | | 50 | 50 | | |
| 3 | | | 50 | 50 | |
| 4 | | | | 50 | 50 |
| 5 | 50 | | | | 50 |

[1] Hydrocarbon charge.

This is a typical commercial operation utilized in the production of butadiene and butylenes. Batteries of three to seven reactors may be employed with suitable adjustment of cycle operation. It is evident from the above that two cases, or reactors, are simultaneously performing similar operations at like portions of the cycle. In usual plant design the charge rate and temperature adjustment of the charge have relatively little freedom of adjustment, and are normally adapted to full five-reactor operation. From the cycle illustrated above it is readily discernible while two reactors are always receiving the full amount of the charge, evenly divided between them; the cycle is so arranged that while one reactor is receiving its full share (50%) of the charge during the set on-stream time, another reactor is receiving 50% of the charge for the first half of the set time after which during the second half of the time still another reactor receives the 50% of the charge.

The cycle changes when one of the cases or reactors is subjected to treatment described in the above identified application inasmuch as that reactor is not available to perform its functions in the normal operating cycle. Therefore a 5-case system, with one of the cases off-stream for the special oxidative treatment, to maintain the same through-put finds but 4 cases operating. With only 4 cases available the cycle is adjusted to give 2 cases operating in concert through 2 of the process stages and 2 of the cases operating singly at double capacity during the same cyclic operation periods as shown below. Reactor #5 is on special treatment.

MODIFIED CYCLE II

| Cycle Segment, Minute | 0–4 | 4–8 | 8–12 | 12–16 | 16–20 (Repeat) |
|---|---|---|---|---|---|
| Reactor: | | | | | |
| 1 | 100 | 50 | | | |
| 2 | | 50 | 50 | | |
| 3 | | | 50 | 50 | |
| 4 | | | | 50 | 100 |
| 5 | None | None | None | None | None |

This system therefore is adapted for continuous operation at constant through-put by the utilization of this definite operating requirement established through the non-participation of one case of the 5-unit string.

Continuing the illustration, reactor 5 is subjected to the special reactivation treatment with oxygen-containing gas at high temperature for an extended time period. During this time the other four reactors operate in accordance with the modified cycle II. At the completion of the special reactivation of the catalyst in reactor 5, return of reactor 5 to its use in the battery is indicated. Several problems have to be solved for successful return of the specially reactivated catalyst. One problem is due to the high average temperature of the catalyst, and another problem is due to the higher activity level. These two conditions could have adverse effect on temperature balance.

The higher average temperature, which is fairly uniform throughout the catalyst bed, would produce greater quantities of coke as would also the higher activity of the catalyst at the higher temperature when returned to on-stream operation. In turn, normal regeneration by oxidative coke removal would lead to higher temperatures than normal because of the greater amount of coke to be burned; so the temperature difficulties would be cumulative. This invention overcomes these difficulties by minimizing the temperature effects through the expedient of charging the hydrocarbon at a higher through-put so that the charge, introduced at a temperature lower than the catalyst temperature, helps remove some of the heat in the bed as sensible heat; and that the higher space rate is effective in reducing the amount of reaction. Thus, the higher space rate results in a lowered amount of conversion while the pounds of charge dehydrogenated are greater. Since the reaction is endothermic more heat is removed from the bed and the bed temperature is lowered more rapidly. Because of the lower bed temperature and the smaller proportional amount of olefins produced the amount of coke is also reduced. These several effects combine to lower the catalyst temperature more rapidly and bring the temperatures in line with normal operation.

To achieve therefore the advantage of operation in accordance with this invention, different cycles are set up as illustrated below.

NEW CYCLE III

| Cycle Segment, Minute | 0–4 | 4–8 | 8–12 | 12–16 | 16–20 |
|---|---|---|---|---|---|
| Reactor: | | | | | |
| 1 | 50 | 50 | | | |
| 2 | | 50 | 50 | | |
| 3 | | | 50 | 100 | |
| 4 | None | None | None | None | None |
| 5 | 50 | | | | 100 |

The above cycle pattern demonstrates that #4 unit is taken off-stream for an extended oxidation treatment and reactors #3 and #5 receive hydrocarbons at twice the space rate during at least a portion of the on-stream period. Thus, the operation in this manner, which is in essence a reverse order, the freshly reactivated catalyst from the extended oxidative treatment is subject to hydrocarbon charge at twice the space rate for approximately the first half of its cycle and thus assists in the return and maintenance of the reactor in positive heat balance. This control of temperature ordinarily is obtained in at least six full cycles and no more than thirty-six complete cycles.

One benefit to be gained by an operation in accordance with this invention appears in Example I.

*Example 1*

A sample of fresh commercial catalyst having a composition of approximately 80% activated alumina, 0.5% silica and 19.5% chromia had a surface oxidation value of 0.55 milliequivalent of oxygen/gram of catalyst. After extended operating life in the production of butadiene the yield rate was found to be 12.6% butadiene at 2.0 space rate and 1120° F. reactor bed outlet temperature. The surface oxidation value was reduced to 0.32 meq./gm. In this semi-deactivated state the catalyst was given the customary regeneration to remove substantially all of the coke which was effected in less than 10 minutes. Thereafter this catalyst was treated with oxygen at 1112° F. for 10 hours. The surface oxidation value increased to 0.44 and the butadiene yield was increased approximately 35% at the same temperature of operation. The unit so reactivated in the special reactivation treatment is then put back on-stream. Considering this unit as unit #4 in the cycle operation immediately above, the cycle must change to receive this unit and provide another unit for special reactivation. Also, previously reactivated reactor #5 above will then be operating at normal space rate and the cycle will shift to exclude reactor #3. The cycle assumes the following form.

NEW CYCLE IV

| Cycle Segment, Minute | 0-4 | 4-8 | 8-12 | 12-16 | 16-20 |
|---|---|---|---|---|---|
| Reactor: | | | | | |
| 1 | 50 | 50 | | | |
| 2 | | 50 | 100 | | |
| 3 | None | None | None | None | None |
| 4 | | | | 100 | 50 |
| 5 | 50 | | | | 50 |

This type of cycle adjustment in the five reactor system shown may thus be utilized during and after the special reactivating treatment accorded a particular reactor. In the system thus illustrated the time period for the special reactivation of a particular reactor coincides with the special features of this invention of returning a specially reactivated reactor to the cyclic operation at conditions of reduced severity. It will be understood that in other types of cyclic systems or even in blocked out operation adjustments of operation can be made to secure the benefits of the invention.

The butadiene yield at the same operating temperature which in reactors 1 and 5 is producing 13.6% butadiene will be producing only 9.2% butadiene at the same temperature in reactor 2. Since the normal production is arbitrarily set as 12.6%, each reactor individually specially reactivated on the new cycle III schedule continuously results in a production equivalent to $\frac{3}{5} \times 12.6 + \frac{2}{5} \times 9.2$ which would equal 11.2% butadiene in the absence of any extended reactivation. However, since the reactors in a reasonable order are being given the extended reactivation treatment in accordance with this invention, the higher activity using the above described New Cycle IV becomes $11.2 + 11.2 \times .35$ for a total yield of 15.1% butadiene which is equivalent to an increase of 20% in the production of butadiene over production obtained in the absence of the extended oxidative reactivation.

Among possible modifications within the scope of this invention it is obvious that a reaction zone containing fresh higher activity catalyst may be successfully introduced into a battery operating with catalyst of lower activity.

Obviously, many modifications and variations of the present invention as hereinbefore set forth may be made without departing from the spirit and scope thereof and therefore only such limitations should be imposed as are indicated in the appended claims.

What is claimed is:

1. In the process for the dehydrogenation of $C_3$, $C_4$ and $C_5$ hydrocarbons for the production of olefinic products in cyclic operation providing alternating fixed on-stream and regeneration periods and wherein chromia on alumina catalyst is the catalyst employed at dehydrogenating conditions which are progressively increased in severity to compensate catalyst activity loss other than loss due to coke deposition, further characterized in that the cycle is interrupted for an interval of time with the concommitant treatment of said catalyst during said interval with hot oxygen-containing gas for a time of at least two hours at a temperature in excess of 1100° F., the improvement which comprises returning said treated catalyst to said cyclic operation under conditions of reduced severity during the on-stream portion of the cycle for at least 6 and no more than 36 normal on-stream cycles.

2. In the process for the production of less saturated hydrocarbons from more saturated hydrocarbons having 3 to 5 carbon atoms by contact with chromia on alumina catalyst at dehydrogenation conditions in cyclic operation providing fixed on-stream and regeneration periods in a battery of reaction zones operating within said cycle, and wherein at least one of said reaction zones is removed from said cycle and catalyst therein treated for at least 2 hours and no more than 12 hours at a temperature of more than 1100° F. and no more than 1500° F. and effecting thereby an activation of said treated catalyst over and above the activity of such catalyst after standard regeneration, the improvement which comprises returning said zone containing said treated catalyst to said cyclic operation under conditions of reduced severity during the on-stream portion of the cycle of said zone for at least 6 and no more than 36 normal on-stream cycles.

3. In the process of claim 2, the improvement further characterized in that said conditions of reduced severity include a charge space velocity about double the normal space velocity for at least the first half of said on-stream portion of each cycle of said 6 to 36 normal on-stream cycles.

4. In the process of claim 2, the improvement further characterized in that said saturated hydrocarbons are substantially $C_4$ hydrocarbons and said less saturated hydrocarbons are butenes and butadienes.

5. The process for the dehydrogenation of more saturated $C_3$–$C_5$ hydrocarbons to less saturated hydrocarbons in cyclic operation utilizing a battery of reaction zones containing chromia on alumina dehydrogenation catalyst and operating at dehydrogenation conditions during the on-steam portion of the cycle, said cycle including a regeneration period, with the improvement comprising intriducing into said cycle an additional reaction zone containing chromia on alumina catalyst having a higher activity for dehydrogenation than the activity of the catalyst in said reaction zones already in cycle, with said higher activity catalyst having higher average temeprature than the average temperature of said reaction zones already in cycle, said introduction being effected at conditions of on-stream operation for said introduced reaction zone reduced in severity below those of said reaction zones already in cycle for a time period of at least 6 and no more than 36 complete cycles and establishing thereby said introduced reaction zone into heat balanced operation in said battery.

6. The process for the dehydrogenation of more saturated $C_3$–$C_5$ hydrocarbons to less saturated hydrocarbons in cyclic operation utilizing a battery of reaction zones containing chromia on alumina dehydrogenation catalyst and operating at dehydrogenation condition during the on-stream portion of the cycle, said cycle including a regeneration period in which inactivating coke deposited during the on-stream period is removed by oxidation, further characterized in that said catalyst during normal use has been deactivated in a form not reactivated during normal regeneration but is at least partially reactivatable by oxidative treatment at a temperature above 1100° F. for a time of at least 2 hours in addition to said normal regeneration, with the improvement wherein said cyclic operation in a battery of five reaction zones includes an additional cycle for the seriatim special high temperature, extended time oxidative reactivation of catalyst in each of said reaction zones, said additional cycle comprising removing one of said reaction zones from said normal cycle and subjecting the catalyst therein to said special reactivation, simultaneously operating at least one reaction zone normally preceding said removed zone and at least one reaction zone normally following said removed zone at conditions of reduced severity for at least a portion of their respective on-stream portion of said normal cycle, effecting special reactivation of said catalyst in said removed zone by said special treatment, returning said specially reactivated catalyst to said normal cycle as substitute for said reaction zone following said removed zone while simultaneously removing said reaction zone preceding said newly removed zone, applying said additional cycle to include each of said reaction zones in turn, and maintaining in each of said specially reactivated zones upon their return to said normal cycle conditions of reduced severity during their respective on-stream periods for at least 6 and no more than 36 normal cycles.

7. In the process for the production of less saturated hydrocarbons from more saturated hydrocarbons having 3 to 5 carbon atoms by contact with chromia on alumina catalyst at dehydrogenation conditions in cyclic operation providing fixed on-stream and regeneration periods in a battery of reaction zones operating within said cycle, and wherein at least one of said reaction zones is removed from said cycle and catalyst therein treated with an oxidizing atmosphere for at least 2 hours and no more than 12 hours at a temperature of more than 1100° F. and no more than 1500° F. and effecting thereby an activation of said treated catalyst over an above the activity of such catalyst after standard regeneration, the improvement which comprises returning said zone containing said treated catalyst to said cyclic operations under conditions of reduced severity including introduction of charge during said on-stream period at a space velocity of at least double normal space velocity for at least the first half of said on-stream period, and continuing operation of said returned zone at said conditions of reduced severity until said returned zone is in substantially heat balanced operation with the other cycling reaction zones in said battery.

References Cited in the file of this patent
UNITED STATES PATENTS

| 2,474,014 | Seebold | June 21, 1949 |
| 2,824,843 | Dietzler et al. | Feb. 25, 1958 |
| 2,884,473 | Reilly et al. | Apr. 28, 1959 |